United States Patent
Hashimoto et al.

(10) Patent No.: US 9,136,735 B2
(45) Date of Patent: Sep. 15, 2015

(54) ROTARY ELECTRIC MACHINE LAMINATED CORE

(75) Inventors: Akira Hashimoto, Tokyo (JP); Yuji Nakahara, Tokyo (JP); Hiroyuki Akita, Tokyo (JP); Takanori Ichikawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 197 days.

(21) Appl. No.: 13/515,963

(22) PCT Filed: Apr. 8, 2010

(86) PCT No.: PCT/JP2010/056365
§ 371 (c)(1),
(2), (4) Date: Jun. 14, 2012

(87) PCT Pub. No.: WO2011/125199
PCT Pub. Date: Oct. 13, 2011

(65) Prior Publication Data
US 2012/0248928 A1    Oct. 4, 2012

(51) Int. Cl.
*H02K 1/18* (2006.01)
*H02K 1/14* (2006.01)

(52) U.S. Cl.
CPC .................................... *H02K 1/148* (2013.01)

(58) Field of Classification Search
USPC .............. 310/216.008, 216.009, 216.011, 310/216.019, 216.043, 216.044, 216.048, 310/216.051, 216.055, 216.109, 216.111
See application file for complete search history.

(56) References Cited

U.S. PATENT DOCUMENTS

| | | | | |
|---|---|---|---|---|
| 4,990,809 A | * | 2/1991 | Artus et al. | 310/192 |
| 5,729,072 A | * | 3/1998 | Hirano et al. | 310/216.009 |
| 6,226,856 B1 | * | 5/2001 | Kazama et al. | 29/596 |
| 6,369,687 B1 | | 4/2002 | Akita et al. | |
| 6,538,548 B2 | * | 3/2003 | Akita et al. | 336/234 |

(Continued)

FOREIGN PATENT DOCUMENTS

| | | |
|---|---|---|
| JP | 11215744 | 8/1999 |
| JP | 2000 69693 | 3/2000 |

(Continued)

OTHER PUBLICATIONS

International Search Report issued on Jul. 13, 2010 in PCT/JP10/56365 filed on Apr. 8, 2010.

(Continued)

*Primary Examiner* — Naishadh Desai
(74) *Attorney, Agent, or Firm* — Oblon, McClelland, Maier & Neustadt, L.L.P.

(57) ABSTRACT

In a rotary electric machine laminated core, a rotating shaft portion is disposed closer to an outer circumferential surface than an inner circumferential surface of a back yoke portion. A notch portion is disposed on at least one of first and second end portions of the back yoke portion so as to form a gap between a vicinity of the rotating shaft portion of a projecting portion and a recess portion when core segments are arranged in an annular shape or a circular arc shape. The first end portion and the second end portion of the back yoke portion are configured such that a predetermined gap that connects from the outer circumferential side to the inner circumferential side is formed between adjacent projecting portions and recess portions when the core segments are expanded rectilinearly such that magnetic pole tooth portions are parallel to each other.

4 Claims, 10 Drawing Sheets

(56) References Cited

U.S. PATENT DOCUMENTS

| | | | |
|---|---|---|---|
| 7,120,985 B2* | 10/2006 | Nouzumi | 29/596 |
| 7,122,933 B2* | 10/2006 | Horst et al. | 310/216.095 |
| 7,126,248 B2* | 10/2006 | Nishiyama et al. | 310/216.065 |
| 7,345,397 B2* | 3/2008 | Sheeran et al. | 310/216.009 |
| 7,348,706 B2* | 3/2008 | Ionel et al. | 310/216.009 |
| 2002/0075121 A1 | 6/2002 | Akita et al. | |
| 2004/0222715 A1 | 11/2004 | Yamamura et al. | |
| 2005/0229383 A1 | 10/2005 | Yamamura et al. | |

FOREIGN PATENT DOCUMENTS

| | | |
|---|---|---|
| JP | 2000 201458 | 7/2000 |
| JP | 2002 171725 | 6/2002 |
| JP | 2004-274914 A | 9/2004 |
| JP | 2004 357491 | 12/2004 |
| JP | 2006 271091 | 10/2006 |
| JP | 2006 304460 | 11/2006 |
| JP | 2009 033810 | 2/2009 |
| JP | 2009 254086 | 10/2009 |
| JP | 2010-74881 A | 4/2010 |

OTHER PUBLICATIONS

Office Action issued Feb. 25, 2014, in Japanese Patent Application No. 2012-509243 (with English Summary).

* cited by examiner

ROTARY ELECTRIC MACHINE LAMINATED CORE

TECHNICAL FIELD

The present invention relates to construction of a rotary electric machine laminated core, and particularly relates to improvements in characteristics and productivity of a laminated core that has a construction in which laminar core segments are stacked and integrated, and end portions thereof are joined to each other.

BACKGROUND ART

Conventional rotary electric machine laminated cores are configured by linking in a circumferential direction a plurality of core blocks that are formed by stacking a plurality of core segments. When manufacturing laminated cores of this kind, a plurality of first core members and a plurality of second core members are stacked alternately. Each of the first core members is configured by linking a plurality of core segments in a single row. Each of the second core members is configured by linking in a single row a plurality of core segments that are oriented in a reverse direction to the core segments in the first core members.

Each of the core segments has: a back yoke portion; a magnetic pole tooth portion that protrudes outward from the back yoke portion; a circular arc-shaped projecting portion that is disposed on a first end portion of the back yoke portion; a circular arc-shaped recess portion that is disposed on a second end portion of the back yoke portion; and a rotating shaft portion that is disposed on the circular arc-shaped projecting portion. Each of the core segments is coupled pivotably to an adjacent core segment by placing the projecting portion in contact with the recess portion of the adjacent core segment so as to fit together therewith (see Patent Literature 1, for example).

The projecting portions and recess portions of the core segments are formed by punching and lancing in a die (see Patent Literature 2, for example).

CITATION LIST

Patent Literature

[Patent Literature 1]
Japanese Patent Laid-Open No. 2000-201458 (Gazette)
[Patent Literature 2]
Japanese Patent Laid-Open No. 2002-171725 (Gazette)

SUMMARY OF THE INVENTION

Problem to be Solved by the Invention

In conventional laminated core such as those described above, because the interfitting contacting portions of the core segments are formed by lancing, warping arises in portions that correspond to the bending fulcrum of lancing, and some problems have been that efficiency of the rotary electric machine is reduced, and torque pulsation is increased, etc., due to reductions in shape accuracy and partial magnetostriction.

In FIG. 2 of Patent Literature 1, a method is disclosed in which material yield of the laminated core is improved by pressing the core segments so as to be disposed in a rectilinear pattern, but in that case, scrap is generated at boundary portions between the lanced portion and the pressed portion while press-punching, and one problem has been that this scrap is a factor in laminated core damage and pressing die damage.

The present invention aims to solve the above problems and an object of the present invention is to provide a rotary electric machine laminated core that can be configured such that a core segment stacking step and a linking step can be performed simultaneously so as to allow for productivity, and that can also achieve improvements in characteristics such as efficiency and torque pulsation by reducing core segment machining strain, to increase material yield, and to enable manufacturing problems to be prevented.

Means for Solving the Problem

In order to achieve the above object, according to one aspect of the present invention, there is provided a rotary electric machine laminated core including a plurality of core segments that include: a back yoke portion; a magnetic pole tooth portion that protrudes outward from the back yoke portion; a projecting portion that is disposed on a first end portion of the back yoke portion; a recess portion that is disposed on a second end portion of the back yoke portion; and a rotating shaft portion that is disposed on the projecting portion, the core segments being arranged into an annular shape, and being stacked in an axial direction of a rotary electric machine, wherein: the projecting portions are abutted to the recess portions of circumferentially adjacent core segments; a first core member that is formed by sequentially arranging the core segments such that the projecting portions are oriented in a first direction relative to a direction of rotation of the rotary electric machine, and a second core member that is formed by sequentially arranging the core segments such that the projecting portions are oriented in a second direction relative to the direction of rotation of the rotary electric machine are stacked alternately and linked to each other; and a plurality of core blocks that are formed by stacking the core segments are linked so as to be mutually rotatable around the rotating shaft portion, and the rotating shaft portions are disposed closer to an outer circumferential surface than an inner circumferential surface of the back yoke portions; a notch portion is disposed on at least one of the first and second end portions of the back yoke portions so as to form a gap between a vicinity of the rotating shaft portion of the projecting portions and the recess portions when the core segments are arranged in an annular shape or a circular arc shape; and the first end portion and the second end portion of the back yoke portions are configured such that a predetermined gap that connects from an outer circumferential side to an inner circumferential side is formed between adjacent projecting portions and recess portions when the core segments are expanded rectilinearly such that the magnetic pole tooth portions are parallel to each other.

Effects of the Invention

In a rotary electric machine laminated core according to the present invention, because the notch portions are disposed in the vicinity of the rotating shaft portions of adjacent projecting portions and recess portions, and the predetermined gap that connects from the outer circumferential side to the inner circumferential side of the back yoke portions is formed between the adjacent projecting portions and recess portions when expanded rectilinearly such that the respective magnetic pole tooth portions are parallel, pressing is made possible without using lancing methods when the core segments are arranged rectilinearly, reducing machining strain, and enabling improvements in characteristics such as efficiency and torque pulsation to be achieved. The generation of scrap is also reduced, enabling productivity to be improved. In addition, since the core segments can be pressed while arranged rectilinearly on a metal sheet, material yield can be improved.

DESCRIPTION OF EMBODIMENTS

Preferred embodiments of the present invention will now be explained with reference to the drawings.

Embodiment 1

Figure 1:
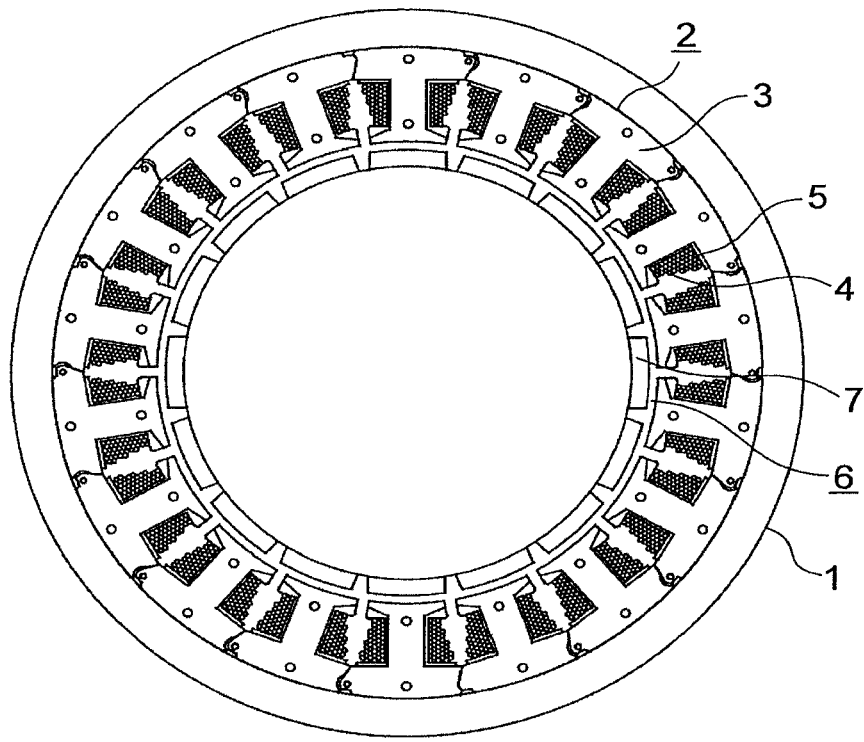
FIG. 1 is a plan that shows a rotary electric machine according to Embodiment 1 of the present invention.

FIG. 1 is a plan that shows a rotary electric machine according to Embodiment 1 of the present invention. In the figure, a cylindrical stator 2 is held inside a cylindrical housing 1. The stator 2 has: a laminated core 3; a driving coil 4 that is wound onto the laminated core 3; and insulators 5 that are interposed between the laminated core 3 and the driving coil 4.

A rotor 6 is disposed inside the stator 2. The rotor 6 is held by the housing 1 so as to be rotatable relative to the stator 2. The rotor 6 has: a plurality of permanent magnets 7 that are fixed to an outer circumferential portion thereof, and that face the stator 2.

Figure 2:
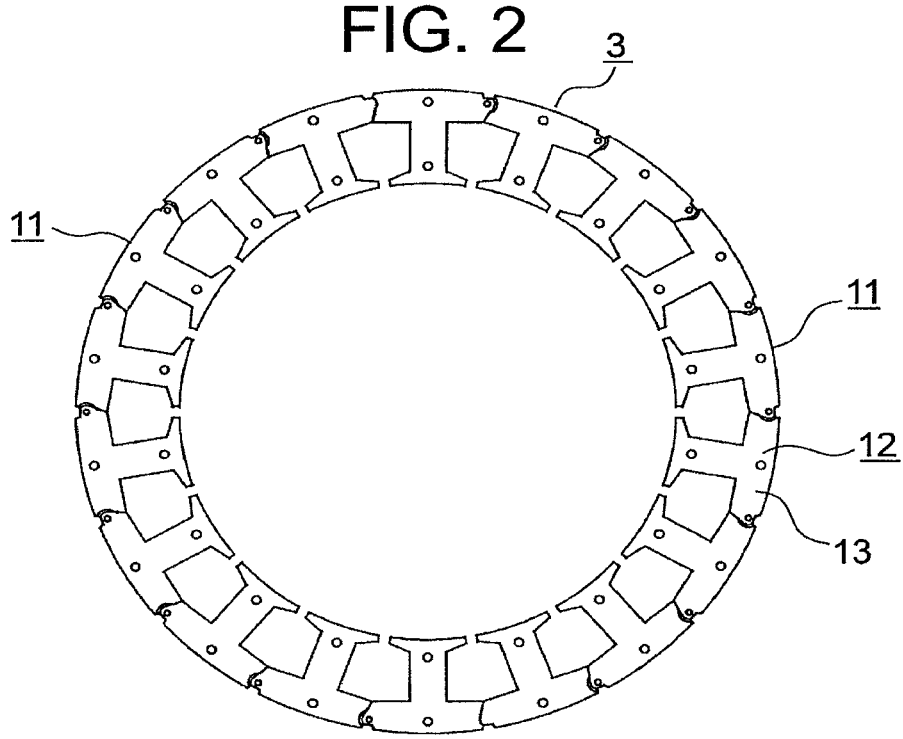
FIG. 2 is a plan that shows a laminated core from FIG. 1.
Figure 3:
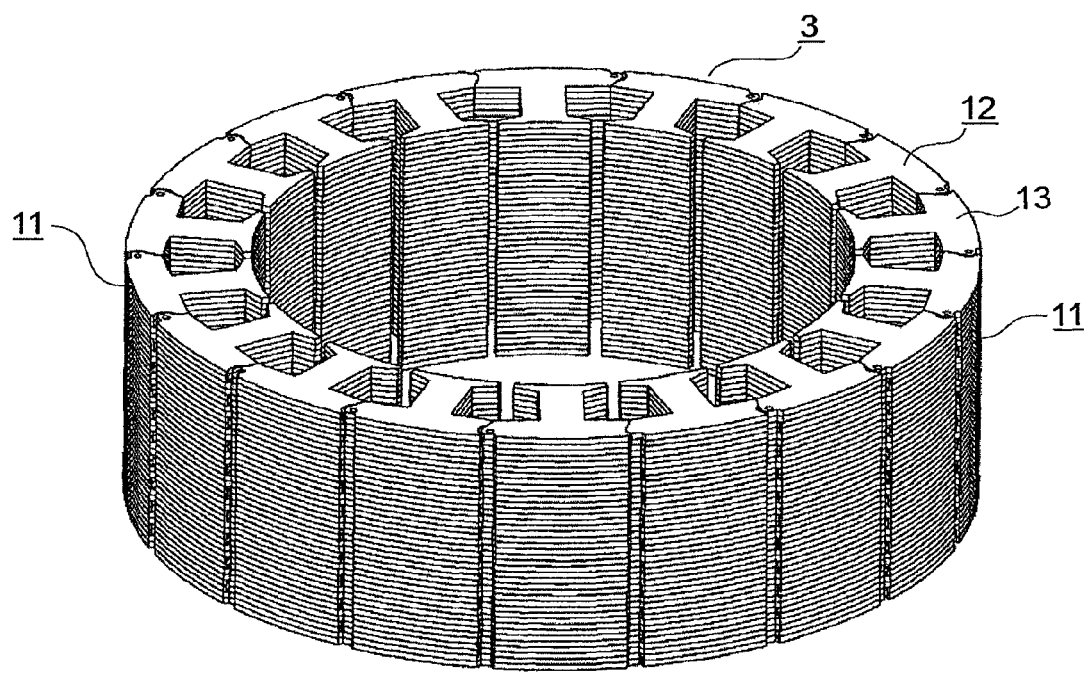
FIG. 3 is a perspective that shows the laminated core from FIG. 1.
Figure 4:
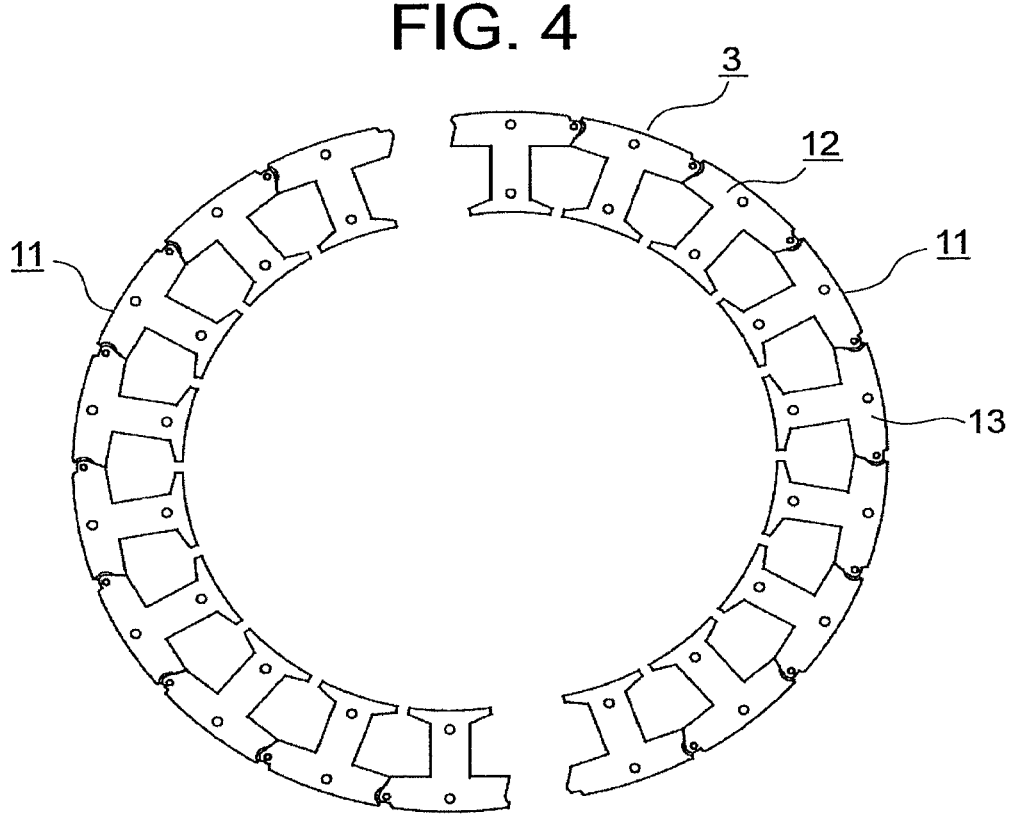
FIG. 4 is a plan that shows a state during assembly of the laminated core from FIG. 1.

FIG. 2 is a plan that shows the laminated core 3 from FIG. 1, FIG. 3 is a perspective that shows the laminated core 3 from FIG. 1, and FIG. 4 is a plan that shows a state during assembly of the laminated core 3 from FIG. 1. As shown in FIG. 4, the laminated core 3 is configured by combining a plurality of (in this example, two) circular arc-shaped segmented laminated cores 11 into an annular shape. Each of segmented laminated cores 11 is configured by linking a plurality of (in this example, nine) core blocks 12 so as to be mutually rotatable. Each of the core blocks 12 is configured by stacking a plurality of core segments 13 in an axial direction of the rotary electric machine.

Figure 5:
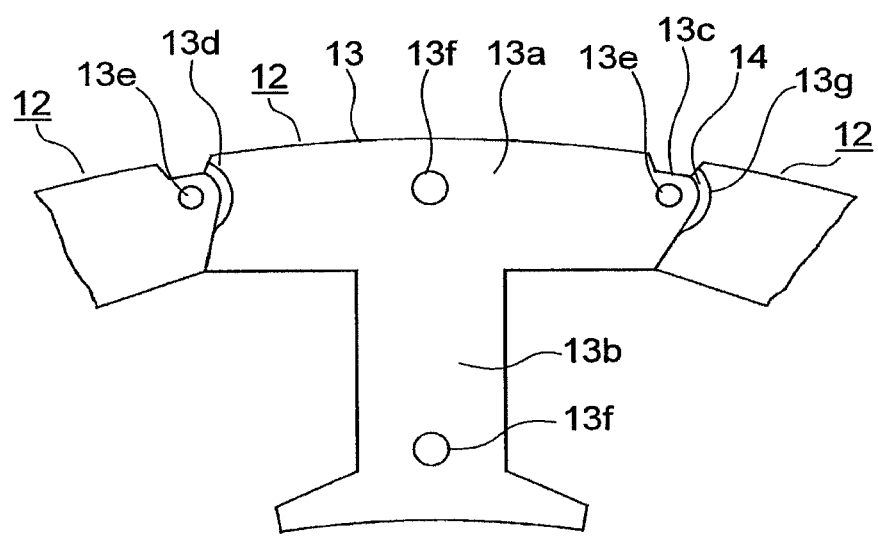
FIG. 5 is a plan that shows a core segment from FIG. 4 enlarged.

FIG. 5 is a plan that shows a core segment 13 from FIG. 4 enlarged. The core segment 13 has: a back yoke portion 13a that forms an annular yoke portion of the laminated core 3; and a magnetic pole tooth portion 13b that protrudes outward toward a radially inner side of the laminated core 3 from the back yoke portion 13a, and onto which the driving coil 4 is wound.

A projecting portion 13c is disposed on a first end portion which is a first end portion of the back yoke portion 13a in a circumferential direction of the laminated core 3. A recess portion 13d is disposed on a second end portion which is a second end portion of the back yoke portion 13a in the circumferential direction of the laminated core 3. The projecting portion 13c is abutted to the recess portion 13d of a circumferentially adjacent core segment 13.

A rotating shaft portion 13e that protrudes outward in an axial direction of the rotary electric machine is disposed on the projecting portion 13c. The core blocks 12 are linked so as to be mutually rotatable around the rotating shaft portion 13e. The rotating shaft portion 13e is disposed closer to an outer circumferential surface of the back yoke portion 13a than to an inner circumferential surface.

Punch-crimped portions 13f are disposed centrally on the back yoke portion 13a and in a vicinity of a tip end portion of the magnetic pole tooth portion 13b. The stacked core segments 13 are fixed to each other by the punch-crimped portions 13f.

A circular arc-shaped notch portion 13g is disposed on the second end portion of the back yoke portion 13a such that a gap 14 is formed with the adjacent projecting portion 13c in a vicinity of the rotating shaft portion 13e when the core segments 13 are arranged in an annular shape or a circular arc shape.

Figure 6:
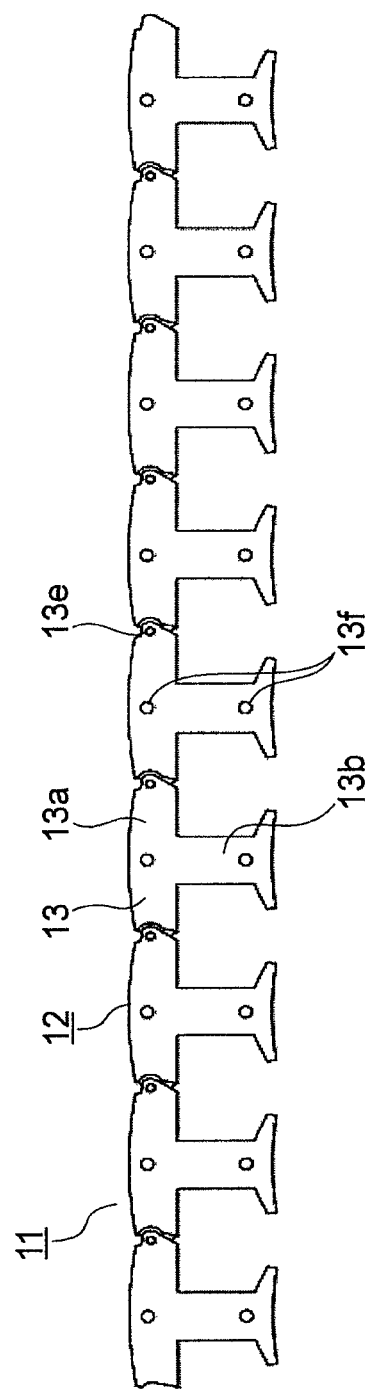
FIG. 6 is a plan that shows a state in which segmented laminated cores from FIG. 4 are expanded rectilinearly.

FIG. 6 is a plan that shows a state in which the segmented laminated cores 11 from FIG. 4 are expanded rectilinearly. The first end portions and the second end portions of the back yoke portion 13a are configured such that predetermined gaps that connect the outer circumferential side to the inner circumferential side are formed between the adjacent projecting portions 13c and recess portions 13d when the core segments 13 are expanded rectilinearly such that the magnetic pole tooth portions 13b are parallel to each other.

Figure 7:
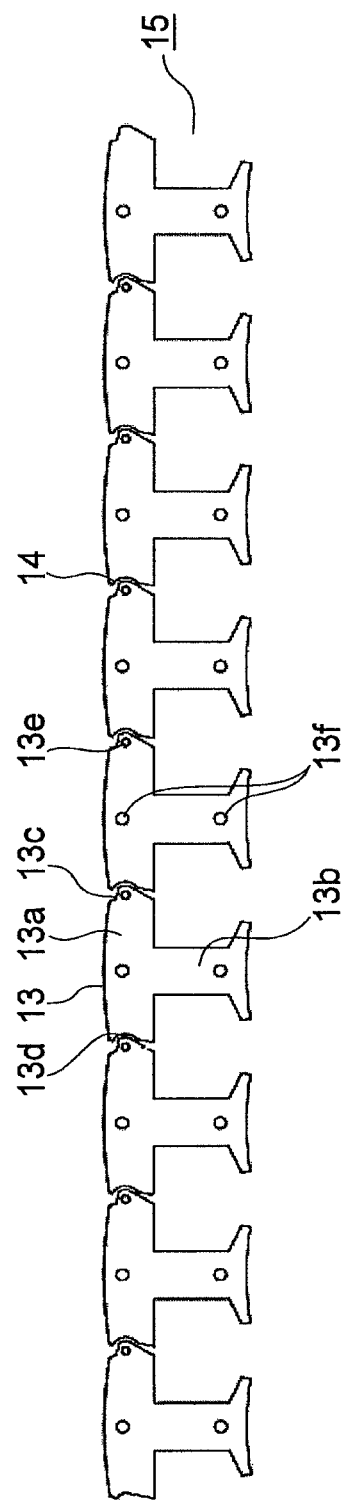
FIG. 7 is a plan that shows a pressed state of a first core member that is included in segmented laminated cores from FIG. 6.
Figure 8:
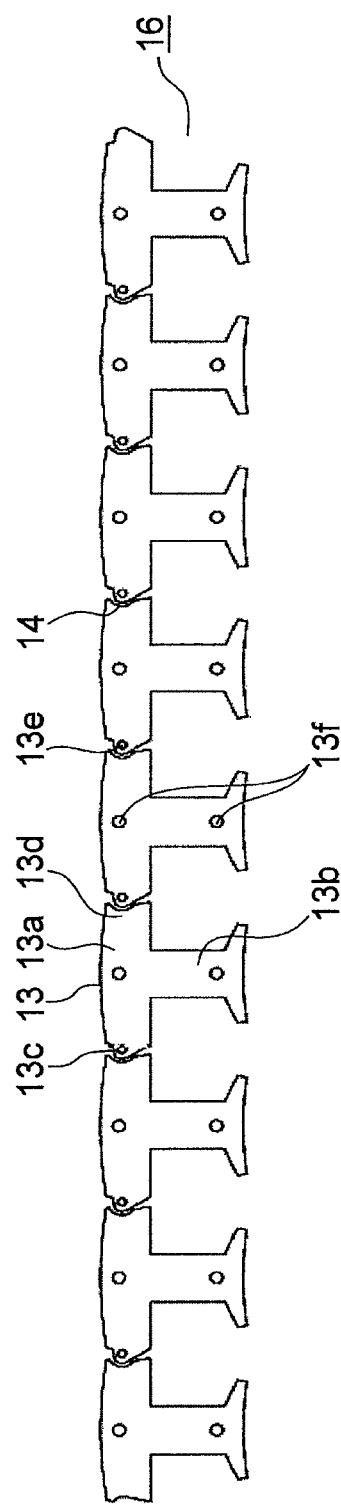
FIG. 8 is a plan that shows a pressed state of a second core member that is included in the segmented laminated cores from FIG. 6.
Figure 9:
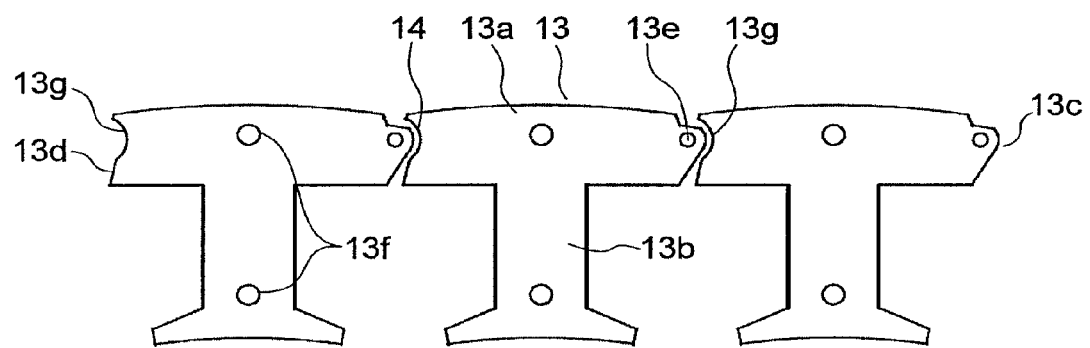
FIG. 9 is a plan that shows a portion of the first core member from FIG. 7 enlarged.

FIG. 7 is a plan that shows a pressed state of a first core member 15 that is included in the segmented laminated cores 11 from FIG. 6, FIG. 8 is a plan that shows a pressed state of a second core member 16 that is included in the segmented laminated cores 11 from FIG. 6, and FIG. 9 is a plan that shows a portion of the first core member 15 from FIG. 7 enlarged.

In the segmented laminated cores 11, first core members 15 that are formed by sequentially arranging core segments 13 in which the projecting portions 13c are oriented in a first direction relative to a direction of rotation of the rotary electric machine and second core members 16 that are formed by sequentially arranging core segments 13 in which the projecting portions 13c are oriented in a second direction relative to the direction of rotation of the rotary electric machine are stacked alternately and linked to each other. As shown in FIGS. 7 and 8, these first and second core members 15 and 16 are manufactured by pressing a magnetic material so as to be expanded rectilinearly such that the magnetic pole tooth portions 13b are parallel. In this example, two layers each of the first and second core members 15 and 16 are stacked alternately, and are linked in the direction of lamination by the punch-crimped portions 13f.

Moreover, in order to suppress pressing die cutter damage, etc., it is preferable for dimensions of the gaps that connect the outer circumferential side of the back yoke portion 13a to the inner circumferential side to be set to greater than or equal to a thickness dimension (approximately 0.5 mm, for example) of the core segments 13 (the magnetic material).

In a rotary electric machine laminated core of this kind, because the notch portions 13g are disposed on the core segments 13, and the gaps 14 that connect from the outer circumferential side of the back yoke portions 13a to the inner circumferential side are formed between the adjacent projecting portions 13c and recess portions 13d when manufacturing the segmented laminated cores 11 that are expanded rectilinearly such that the respective magnetic pole tooth portions 13b are parallel, pressing of the segmented laminated cores 11 is made possible without using lancing methods, reducing machining strain, and enabling improvements in characteristics such as efficiency and torque pulsation to be achieved.

The generation of scrap is also reduced, enabling productivity to be improved. In addition, since the core segments 13 can be pressed in a rectilinearly arranged state on the electromagnetic steel sheet, material yield can be improved. Furthermore, because the orientation of the core segments 13 on the electromagnetic steel sheet can be set to a constant direction, the influence of magnetic anisotropy in the electromagnetic steel sheet can be reduced compared to when pressed in a circular arc-shaped or annular state, enabling the torque pulsation to be reduced.

Moreover, in Embodiment 1, the notch portions 13g are disposed in the recess portions 13d, but similar or identical effects can also be achieved if the notch portions 13g are disposed on the projecting portions 13c in the vicinity of the rotating shaft portions 13e.

In Embodiment 1, the laminated core 3 is configured by combining two segmented laminated cores 11, but the laminated core 3 may also be configured integrally without segmentation, or may also be configured by combining segmented laminated cores 11 that are divided into three or more segments.

Embodiment 2

Figure 10:
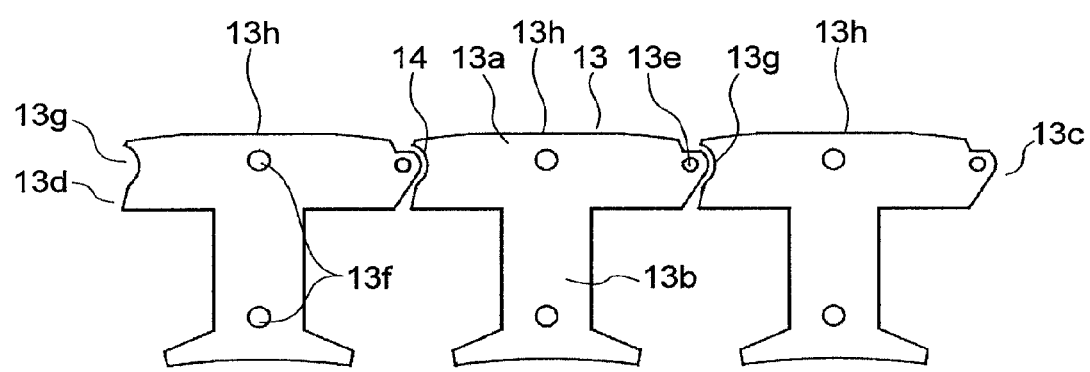
FIG. 10 is a plan that shows part of a rotary electric machine laminated core according to Embodiment 2 of the present invention.

Next, FIG. 10 is a plan that shows part of a rotary electric machine laminated core according to Embodiment 2 of the present invention, and is a figure that corresponds to FIG. 9 in Embodiment 1. Portions identical or equivalent to those in Embodiment 1 will be given identical numbering, and explanation thereof will be omitted.

In the figure, flat portions 13h that are perpendicular to magnetic pole tooth portions 13b are disposed on outer circumferential surfaces of back yoke portions 13a that are positioned radially outside a rotary electric machine. The flat portions 13h on each of the core segments 13 are disposed so as to be positioned collinearly in a state in which the segmented laminated cores 11 are expanded rectilinearly such that the magnetic pole tooth portions 13b are parallel, in other words, in the pressed state of the segmented laminated cores 11 in Embodiment 1.

In a rotary electric machine laminated core of this kind, because the flat portions 13h are disposed on the back yoke portions 13a, surfaces that are formed by the flat portions 13h can be used as control reference surfaces when performing dimensional inspections of the segmented laminated cores 11, enabling dimensional inspections to be performed easily, thereby enabling a highly reliable laminated core to be obtained.

Embodiment 3

Figure 11:
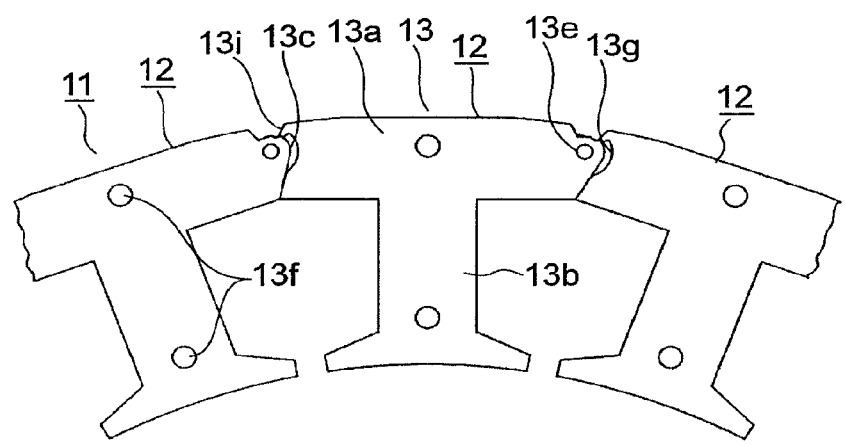
FIG. 11 is a plan that shows part of a rotary electric machine laminated core according to Embodiment 3 of the present invention.
Figure 12:
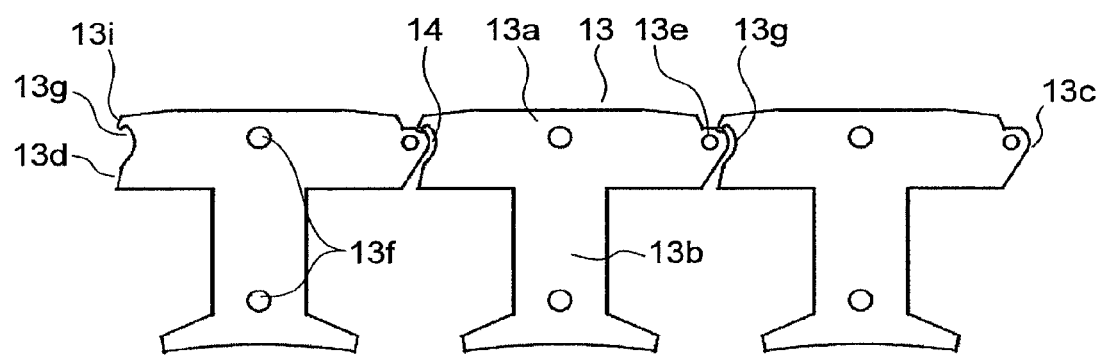
FIG. 12 is a plan that shows a state in which segmented laminated cores from FIG. 11 are expanded rectilinearly.

Next, FIG. 11 is a plan that shows part of a rotary electric machine laminated core according to Embodiment 3 of the present invention, and FIG. 12 is a plan that shows a state in which segmented laminated cores 11 from FIG. 11 are expanded rectilinearly, and are figures that correspond to FIGS. 5 and 9, respectively, in Embodiment 1. Portions identical or equivalent to those in Embodiments 1 and 2 will be given identical numbering, and explanation thereof will be omitted.

In the figures, holding projecting portions 13i that come into contact with projecting portions 13c when core blocks 12 are closed into an annular shape or a circular arc shape are disposed on second end portions of back yoke portions 13a. The holding protruding portions 13i are disposed on outer circumferential end portions of notch portions 13g. The holding protruding portions 13i separate from the projecting portions 13c when the segmented laminated cores 11 are expanded rectilinearly (because the gaps between the projecting portions 13c and the holding protruding portions 13i are minute, the holding protruding portions 13i appear as if contacting the projecting portions 13c in FIG. 12).

In a rotary electric machine laminated core of this kind, because the state in which the segmented laminated cores 11 are closed in an annular shape can be maintained, stability during material handling of the segmented laminated cores 11 is improved, enabling workability when assembling the rotary electric machine to be improved.

Embodiment 4

Figure 13:
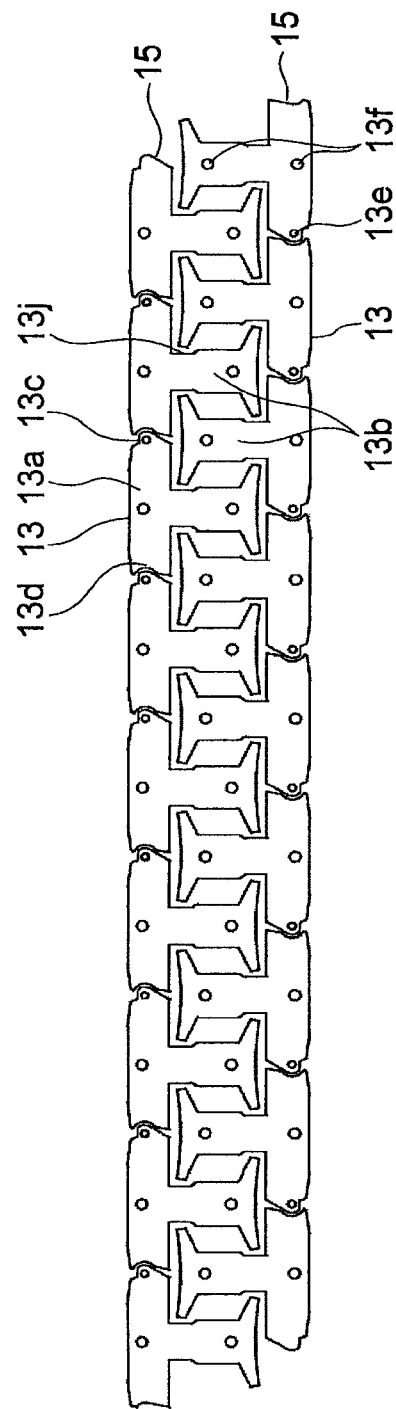
FIG. 13 is a plan that shows a state during assembly of a rotary electric machine laminated core according to Embodiment 4 of the present invention.
Figure 14:
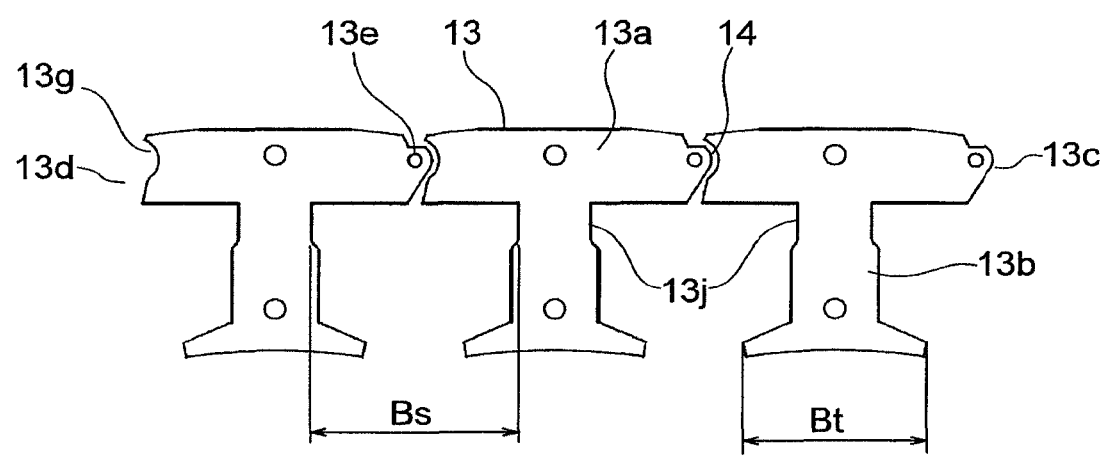
FIG. 14 is a plan that shows part of FIG. 13 enlarged.

Next, FIG. 13 is a plan that shows a state during assembly of a rotary electric machine laminated core according to Embodiment 4 of the present invention, and is a figure that corresponds to FIG. 7 in Embodiment 1. FIG. 14 is a plan that shows part of FIG. 13 enlarged. Portions identical or equivalent to those in Embodiments 1, 2, and 3 will be given identical numbering, and explanation thereof will be omitted.

In the figures, width-reduced portions 13j in which width dimensions are smaller than in adjacent portions on an opposite side from back yoke portions 13a are disposed on magnetic pole tooth portions 13b in a vicinity of linking portions to the back yoke portions 13a. In other words, magnetic pole notch portions are disposed on two sides in a width direction of root portions of the magnetic pole tooth portions 13b. Two segmented laminated cores 11 can thereby be obtained during pressing by disposing the magnetic pole tooth portions 13b of one first core member 15 between the magnetic pole tooth portions 13b of another first core member 15.

As shown in FIG. 14, if Bt is a width dimension at a tip end portion of the magnetic pole tooth portions 13b, and Bs is a width dimension between adjacent width-reduced portions 13j, then Bs>Bt. Moreover, in order to suppress pressing die cutter damage, it is preferable to set Bs so as to be greater than or equal to (Bt+2T), where T is the sheet thickness of the core segments 13 (the magnetic material).

In a rotary electric machine laminated core of this kind, two segmented laminated cores 11 can be obtained during pressing, enabling material yield and productivity improvements to be achieved.

The invention claimed is:

1. A rotary electric machine laminated core comprising:
a plurality of core segments that include
a back yoke portion,
a magnetic pole tooth portion that protrudes outward from the back yoke portion,
a projecting portion that is disposed on a first end portion of the back yoke portion,
a recess portion that is disposed on a second end portion of the back yoke portion, and
a rotating shaft portion that is disposed on the projecting portion;
the core segments being arranged into an annular shape, and being stacked in an axial direction of a rotary electric machine;
the projecting portions are abutted to the recess portions of circumferentially adjacent core segments;
a first core member that is formed by sequentially arranging the core segments such that the projecting portions are oriented in a first direction relative to a direction of rotation of the rotary electric machine, and a second core member that is formed by sequentially arranging the core segments such that the projecting portions are oriented in a second direction relative to the direction of rotation of the rotary electric machine are stacked alternately and linked to each other;
a plurality of core blocks that are formed by stacking the core segments are linked so as to be mutually rotatable around the rotating shaft portion;
the rotating shaft portions are disposed closer to an outer circumferential surface than an inner circumferential surface of the back yoke portions;
a notch portion is disposed on a part of the projecting portions or the recess portions so as to form a gap on a part between a vicinity of the rotating shaft portion of the projecting portions and the recess portions when the core segments are arranged in an annular shape or a circular arc shape and inner circumferential side portions of the projecting portions and the recess portions contact each other; and
the first end portion and the second end portion of the back yoke portions are configured such that a predetermined gap that connects from an outer circumferential side to an inner circumferential side is formed between adjacent projecting portions and recess portions when the core segments are expanded rectilinearly such that the magnetic pole tooth portions are parallel to each other, and a width of the predetermined gap, which is a minimum distance between the adjacent projecting portions and recess portions, is greater than or equal to a thickness dimension of the core segments.

2. The rotary electric machine laminated core according to claim 1, wherein a flat portion that is perpendicular to the magnetic pole tooth portion is disposed on an outer circumferential surface of the back yoke portion that is positioned radially outside the rotary electric machine.

3. The rotary electric machine laminated core according to claim 1, wherein a holding protruding portion that contacts the projecting portion when the core blocks are closed into an annular shape or a circular arc shape is disposed on the second end portion of the back yoke portion.

4. The rotary electric machine laminated core according to claim 1, wherein a width-reduced portion that has a width dimension that is smaller than an adjacent portion on an opposite side from the back yoke portion is disposed in a vicinity of a linking portion between the magnetic pole tooth portion and the back yoke portion.

* * * * *